United States Patent
Kang et al.

(10) Patent No.: US 9,896,597 B2
(45) Date of Patent: *Feb. 20, 2018

(54) METHOD OF PREPARING HARD COATING FILM

(71) Applicant: LG CHEM, LTD., Seoul (KR)

(72) Inventors: Joon Koo Kang, Daejeon (KR); Yeong Rae Chang, Daejeon (KR); Jae Hoon Shim, Daejeon (KR); Sung Don Hong, Daejeon (KR); Seung Jung Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/404,244

(22) PCT Filed: May 31, 2013

(86) PCT No.: PCT/KR2013/004807
§ 371 (c)(1),
(2) Date: Nov. 26, 2014

(87) PCT Pub. No.: WO2013/180511
PCT Pub. Date: Dec. 5, 2013

(65) Prior Publication Data
US 2015/0166750 A1    Jun. 18, 2015

(30) Foreign Application Priority Data

May 31, 2012  (KR) .................. 10-2012-0058634
May 31, 2012  (KR) .................. 10-2012-0058635
(Continued)

(51) Int. Cl.
*C09D 135/02*    (2006.01)
*G02B 1/14*    (2015.01)
(Continued)

(52) U.S. Cl.
CPC ............ *C09D 135/02* (2013.01); *B05D 3/067* (2013.01); *C08J 5/18* (2013.01); *C08J 7/04* (2013.01);
(Continued)

(58) Field of Classification Search
CPC ... B05D 3/067; C08J 7/18; C09D 4/00; C09D 7/1216; C09D 7/1241; C09D 133/14; C08K 3/36; C08K 5/3475; G02B 1/14
See application file for complete search history.

(56) References Cited

U.S. PATENT DOCUMENTS 4,902,578 A    2/1990   Kerr, III
6,245,833 B1   6/2001   Kang et al.
(Continued)

FOREIGN PATENT DOCUMENTS

| CN | 1558824 A | 12/2004 |
|---|---|---|
| CN | 1611968 A | 5/2005 |

(Continued)

OTHER PUBLICATIONS

Search Report issued in International Application No. PCT/KR2013/004809 dated Aug. 12, 2013, 5 pages.
(Continued)

*Primary Examiner* — Dah-Wei D. Yuan
*Assistant Examiner* — Kristen A Dagenais
(74) *Attorney, Agent, or Firm* — Rothwell, Figg, Ernst & Manbeck, P.C.

(57) ABSTRACT

A method of preparing a hard coating film by applying a first hard coating composition onto one side of a supporting substrate, performing a first photocuring by irradiating one side of the supporting substrate, applying a second hard coating composition onto the other side of the supporting substrate, performing a second photocuring by irradiating the other side of the supporting substrate which the second (Continued)

coating composition applied on, with ultraviolet having a first wavelength and a second wavelength longer than the first wavelength.

20 Claims, 2 Drawing Sheets

(30) Foreign Application Priority Data

| | | |
|---|---|---|
| May 31, 2012 | (KR) | 10-2012-0058636 |
| May 31, 2012 | (KR) | 10-2012-0058637 |
| May 30, 2013 | (KR) | 10-2013-0062097 |

(51) Int. Cl.

| | |
|---|---|
| C09D 133/04 | (2006.01) |
| G02B 1/10 | (2015.01) |
| C08K 5/3475 | (2006.01) |
| C09D 7/12 | (2006.01) |
| C09D 105/16 | (2006.01) |
| C09D 133/14 | (2006.01) |
| C09D 167/00 | (2006.01) |
| C08J 7/04 | (2006.01) |
| B05D 3/06 | (2006.01) |
| C09D 4/00 | (2006.01) |
| C08J 5/18 | (2006.01) |
| C08K 3/36 | (2006.01) |
| C08K 3/22 | (2006.01) |

(52) U.S. Cl.
CPC ............... *C08J 7/042* (2013.01); *C08J 7/047* (2013.01); *C08K 5/3475* (2013.01); *C09D 4/00* (2013.01); *C09D 7/1216* (2013.01); *C09D 7/1241* (2013.01); *C09D 105/16* (2013.01); *C09D 133/04* (2013.01); *C09D 133/14* (2013.01); *C09D 167/00* (2013.01); *G02B 1/10* (2013.01); *G02B 1/105* (2013.01); *G02B 1/14* (2015.01); *C08J 2301/12* (2013.01); *C08J 2367/02* (2013.01); *C08J 2433/14* (2013.01); *C08J 2435/02* (2013.01); *C08K 3/36* (2013.01); *C08K 2003/2227* (2013.01); *C08K 2003/2241* (2013.01); *C08K 2003/2296* (2013.01); *C08K 2201/005* (2013.01); *C08K 2201/011* (2013.01); *Y10T 428/2495* (2015.01); *Y10T 428/259* (2015.01); *Y10T 428/269* (2015.01); *Y10T 428/31507* (2015.04); *Y10T 428/31797* (2015.04); *Y10T 428/31884* (2015.04); *Y10T 428/31928* (2015.04)

(56) References Cited

U.S. PATENT DOCUMENTS

| | | | |
|---|---|---|---|
| 6,489,015 | B1 | 12/2002 | Tsuchiya et al. |
| 7,622,055 | B2 | 11/2009 | Nakano et al. |
| 2003/0008162 | A1* | 1/2003 | Oya ............... C08K 5/353 428/480 |
| 2004/0081831 | A1 | 4/2004 | Shoshi et al. |
| 2004/0135159 | A1 | 7/2004 | Siegel |
| 2005/0136252 | A1 | 6/2005 | Chisholm et al. |
| 2005/0136273 | A1 | 6/2005 | Hashimoto et al. |
| 2006/0134400 | A1 | 6/2006 | Takada et al. |
| 2006/0234035 | A1 | 10/2006 | Wang et al. |
| 2006/0286383 | A1 | 12/2006 | Gilmer |
| 2007/0178297 | A1 | 8/2007 | Takada et al. |
| 2007/0231566 | A1* | 10/2007 | Yoneyama ......... G02B 1/105 428/331 |
| 2007/0237966 | A1 | 10/2007 | Takao et al. |
| 2008/0145673 | A1 | 6/2008 | Bonnard |
| 2008/0193722 | A1 | 8/2008 | Tanaka |
| 2008/0206577 | A1* | 8/2008 | Gesell ............... G02B 1/105 428/447 |
| 2008/0218666 | A1 | 9/2008 | Toyooka |
| 2008/0257216 | A1* | 10/2008 | Ravyst ............. C08F 290/06 106/287.26 |
| 2008/0311351 | A1 | 12/2008 | Hsu et al. |
| 2009/0169896 | A1 | 7/2009 | Sohn et al. |
| 2009/0214871 | A1* | 8/2009 | Fukuda ............... C09D 4/00 428/413 |
| 2009/0301561 | A1 | 12/2009 | Wang et al. |
| 2010/0084037 | A1 | 4/2010 | Ericsson et al. |
| 2010/0124631 | A1 | 5/2010 | Horio et al. |
| 2010/0124656 | A1 | 5/2010 | Horio et al. |
| 2010/0167068 | A1 | 7/2010 | Horio |
| 2011/0050623 | A1 | 3/2011 | Lee et al. |
| 2011/0124823 | A1 | 5/2011 | Hayashi et al. |
| 2012/0019766 | A1 | 1/2012 | Oki et al. |
| 2012/0034450 | A1* | 2/2012 | Morita ............. C08J 7/047 428/331 |
| 2012/0128890 | A1 | 5/2012 | Mirchev |
| 2014/0079937 | A1 | 3/2014 | Jung et al. |
| 2015/0299507 | A1 | 10/2015 | Kang et al. |

FOREIGN PATENT DOCUMENTS

| | | |
|---|---|---|
| CN | 1286640 C | 11/2006 |
| CN | 1898341 A | 1/2007 |
| CN | 1934140 A | 3/2007 |
| CN | 101701129 A | 5/2010 |
| CN | 102105515 A | 6/2011 |
| CN | 102257087 A | 11/2011 |
| EP | 0323560 A2 | 7/1989 |
| EP | 0442305 A2 | 8/1991 |
| EP | 0699704 A1 | 3/1996 |
| EP | 1162246 A1 | 12/2001 |
| EP | 2 840 109 A1 | 2/2015 |
| EP | 2 840 110 A1 | 2/2015 |
| EP | 2840107 A1 | 2/2015 |
| EP | 2 842 989 A1 | 3/2015 |
| EP | 2843008 A1 | 3/2015 |
| EP | 2857440 A1 | 4/2015 |
| JP | 10-036540 A | 2/1998 |
| JP | H11-333370 A | 12/1999 |
| JP | 2000-015734 A | 1/2000 |
| JP | 2000-071392 A | 3/2000 |
| JP | 2000-103887 A | 4/2000 |
| JP | 2000-214791 A | 8/2000 |
| JP | 2000-286179 A | 10/2000 |
| JP | 2000-293895 A | 10/2000 |
| JP | 2001-205179 A | 7/2001 |
| JP | 2001-323087 A | 11/2001 |
| JP | 2002-067238 A | 3/2002 |
| JP | 2002-338720 A | 11/2002 |
| JP | 2005-053094 A | 3/2005 |
| JP | 2005-343119 A | 12/2005 |
| JP | 2006-051781 A | 2/2006 |
| JP | 2007-145965 A | 6/2007 |
| JP | 2007-262281 A | 10/2007 |
| JP | 2007-313872 A | 12/2007 |
| JP | 2008-074112 A | 4/2008 |
| JP | 2008-075092 A | 4/2008 |
| JP | 4069499 B2 | 4/2008 |
| JP | 4075147 B2 | 4/2008 |
| JP | 4872893 B2 | 4/2008 |
| JP | 2008-116596 A | 5/2008 |
| JP | 2008-138165 A | 6/2008 |
| JP | 2008-150484 A | 7/2008 |
| JP | 2008-156387 A | 7/2008 |
| JP | 2008-165041 A | 7/2008 |
| JP | 2008-310286 A | 12/2008 |
| JP | 2009-025808 A | 2/2009 |
| JP | 2009-204725 A | 9/2009 |
| JP | 2009-204727 A | 9/2009 |
| JP | 2009-241458 A | 10/2009 |
| JP | 2009-255565 A | 11/2009 |
| JP | 2010-001431 A | 1/2010 |
| JP | 2010-017991 A | 1/2010 |
| JP | 2010-023507 A | 2/2010 |

(56) References Cited

FOREIGN PATENT DOCUMENTS

| | | |
|---|---|---|
| JP | 2010-024449 A | 2/2010 |
| JP | 2010-024450 A | 2/2010 |
| JP | 2010-052334 A | 3/2010 |
| JP | 2010-053231 A | 3/2010 |
| JP | 2010-085985 A | 4/2010 |
| JP | 2010-121013 A | 6/2010 |
| JP | 4496424 B2 | 7/2010 |
| JP | 2010-173234 A | 8/2010 |
| JP | 2010-284910 A | 12/2010 |
| JP | 2011-022456 A | 2/2011 |
| JP | 2011-031457 A | 2/2011 |
| JP | 2011-031527 A | 2/2011 |
| JP | 2011-504828 A | 2/2011 |
| JP | 2011-505452 A | 2/2011 |
| JP | 2011-046917 A | 3/2011 |
| JP | 2011-075705 A | 4/2011 |
| JP | 2011075705 A * | 4/2011 |
| JP | 2011075705 A * | 4/2011 |
| JP | 2011-093290 A | 5/2011 |
| JP | 2011-126160 A | 6/2011 |
| JP | 2011-126164 A | 6/2011 |
| JP | 2011-126165 A | 6/2011 |
| JP | 2011-145593 A | 7/2011 |
| JP | 2011-148181 A | 8/2011 |
| JP | 2011-148301 A | 8/2011 |
| JP | 2011-523370 A | 8/2011 |
| JP | 2011-178910 A | 9/2011 |
| JP | 2011-183561 A | 9/2011 |
| JP | 2011-201087 A | 10/2011 |
| JP | 2011-225846 A | 11/2011 |
| JP | 2011-246548 A | 12/2011 |
| JP | 2012-027190 A | 2/2012 |
| JP | 2012-027401 A | 2/2012 |
| JP | 2012-051118 A | 3/2012 |
| JP | 2012-063577 A | 3/2012 |
| JP | 2012-066477 A | 4/2012 |
| JP | 2012-072235 A | 4/2012 |
| JP | 4911474 B2 | 4/2012 |
| JP | 2012-518713 A | 8/2012 |
| JP | 2012-206262 A | 10/2012 |
| JP | 2013-095108 A | 5/2013 |
| KR | 10-1998-0020031 A | 3/1999 |
| KR | 10-1999-0072670 A | 9/1999 |
| KR | 10-2000-0021805 A | 4/2000 |
| KR | 10-2000-0021806 A | 4/2000 |
| KR | 10-2002-0008267 A | 1/2002 |
| KR | 10-0867338 B1 | 9/2002 |
| KR | 10-2004-0037081 A | 5/2004 |
| KR | 10-2004-0076422 A | 9/2004 |
| KR | 10-2004-0083916 A | 10/2004 |
| KR | 10-2004-0097189 A | 11/2004 |
| KR | 10-2006-0009194 A | 1/2006 |
| KR | 10-2007-0039742 A | 4/2007 |
| KR | 10-0730414 B1 | 6/2007 |
| KR | 10-0735894 B1 | 6/2007 |
| KR | 10-2007-0098560 A | 10/2007 |
| KR | 10-2007-0111352 A | 11/2007 |
| KR | 10-2008-0005839 A | 1/2008 |
| KR | 10-2008-0055698 A | 6/2008 |
| KR | 10-0852562 B1 | 8/2008 |
| KR | 10-2008-0109658 A | 12/2008 |
| KR | 10-2009-0020106 A | 2/2009 |
| KR | 10-0884079 B1 | 2/2009 |
| KR | 10-2009-0044089 A | 5/2009 |
| KR | 10-2009-0061821 A | 6/2009 |
| KR | 10-2009-0063182 A | 6/2009 |
| KR | 10-0905683 B1 | 6/2009 |
| KR | 10-2009-0073668 A | 7/2009 |
| KR | 10-0926220 B1 | 11/2009 |
| KR | 10-2010-0019661 A | 2/2010 |
| KR | 10-0945063 B1 | 2/2010 |
| KR | 10-2010-0026012 A | 3/2010 |
| KR | 10-2010-0026014 A | 3/2010 |
| KR | 10-2010-0037519 A | 4/2010 |
| KR | 10-2010-0041992 A | 4/2010 |
| KR | 10-2010-0045997 A | 5/2010 |
| KR | 10-2010-0055160 A | 5/2010 |
| KR | 10-2010-0077798 A | 7/2010 |
| KR | 10-2010-0098320 A | 9/2010 |
| KR | 10-2010-0121281 A | 11/2010 |
| KR | 10-2010-0124477 A | 11/2010 |
| KR | 10-2010-0129512 A | 12/2010 |
| KR | 10-2010-0130367 A | 12/2010 |
| KR | 10-2010-0132786 A | 12/2010 |
| KR | 10-2011-0034324 A | 4/2011 |
| KR | 10-2011-0037622 A | 4/2011 |
| KR | 10-2011-0047596 A | 5/2011 |
| KR | 10-2011-0058743 A | 6/2011 |
| KR | 10-2011-0071480 A | 6/2011 |
| KR | 10-1058395 B1 | 8/2011 |
| KR | 10-2011-0103885 A | 9/2011 |
| KR | 10-2011-0104663 A | 9/2011 |
| KR | 10-2011-0130142 A | 12/2011 |
| KR | 10-1093721 B1 | 12/2011 |
| KR | 10-2012-00002366 A | 1/2012 |
| KR | 10-1127952 B1 | 3/2012 |
| KR | 10-1150719 B1 | 6/2012 |
| KR | 10-1168073 B1 | 7/2012 |
| KR | 10-2012-0136597 A | 12/2012 |
| KR | 10-1295325 B1 | 8/2013 |
| TW | 200907401 A | 2/2009 |
| TW | 201041985 A | 12/2010 |
| TW | 201105694 A | 2/2011 |
| TW | 201130880 A | 9/2011 |
| TW | 201202403 A | 1/2012 |
| TW | I357922 B | 2/2012 |
| WO | 2007-081186 A1 | 7/2007 |
| WO | 2007-121102 A1 | 10/2007 |
| WO | WO 2008-098872 A1 | 8/2008 |
| WO | 2009-050957 A1 | 4/2009 |
| WO | 2010-035764 A1 | 4/2010 |
| WO | 2011-013611 A | 2/2011 |
| WO | 2011/105532 A1 | 9/2011 |
| WO | 2011-105532 A1 | 9/2011 |
| WO | 2012-026475 A1 | 3/2012 |
| WO | 2012/060145 A1 | 5/2012 |
| WO | 2012-066743 A1 | 5/2012 |
| WO | 2013/105656 A1 | 7/2013 |

OTHER PUBLICATIONS

Search Report issued in International Application No. PCT/KR2013/004804 dated Aug. 19, 2013, 5 pages.
Search Report issued in International Application No. PCT/KR2013/004805 dated Aug. 22, 2013, 5 pages.
Search Report issued in International Application No. PCT/KR2013/004798 dated Aug. 28, 2013, 6 pages.
Search Report issued in International Application No. PCT/KR2013/004807 dated Sep. 4, 2013, 7 pgs.
Search Report issued in International Application No. PCT/KR2013/004812, dated Sep. 12, 2013, 6 pages.
Extended European Search Report dated Dec. 17, 2015, issued in European Patent Application No. 13797819.3, 12 pages.
Extended European Search Report dated Dec. 17, 2015, issued in European Patent Application No. 13797572.8, 10 pages.
Extended European Search Report dated Jan. 8, 2016, issued in European Patent Application No. 13796271.8, 7 pages.
Extended European Search Report dated Jan. 29, 2016, issued in European Patent Application No. 13830624.6, 9 pages.
Extended European Search Report dated Dec. 22, 2015, issued in European Patent Application No. 13798019.9, 9 pages.
Extended European Search Report dated Jan. 8, 2016, issued in European Patent Application No. 13798121.3, 6 pages.
Extended European Search Report dated Jan. 8, 2016, issued in European Patent Application No. 13798100.7, 7 pages.
Extended European Search Report dated Mar. 11, 2016, issued in European Patent Application No. 13830272.4, 7 pages.
Extended European Search Report dated Mar. 14, 2016, issued in European Patent Application No. 13830709.5, 9 pages.
Extended European Search Report dated Mar. 15, 2016, issued in European Patent Application No. 13830681.6, 10 pages.

(56) References Cited

OTHER PUBLICATIONS

Extended European Search Report dated Apr. 4, 2016, issued in European Patent Application No. 13830724.4, 11 pages.
Extended European Search Report dated Apr. 6, 2016, issued in European Patent Application No. 13831327.5, 8 pages.
Shin-Nakamura Chemical Co., Ltd.; (2009); Product list; Retrieved from http://www.shin-nakamura.com/products/monomer-oligomer-07.html (2 pages).
Ciba TINUVIN 900 Light Stabilizer, Ciba Specialty Chemicals, 1997, pp. 1-3.

* cited by examiner

METHOD OF PREPARING HARD COATING FILM

CROSS REFERENCE TO RELATED APPLICATIONS

This application is a 35 U.S.C. § 371 National Phase Entry Application from PCT/KR2013/004807, filed May 31, 2013, and designating the United States, which claims priority under 35 U.S.C. § 119 to Korean Patent Application No. 10-2012-0058634, filed on May 31, 2012, Korean Patent Application No. 10-2012-0058635, filed on May 31, 2012, Korean Patent Application No. 10-2012-0058636, filed on May 31, 2012, Korean Patent Application No. 10-2012-0058637, filed on May 31, 2012, and to Korean Patent Application No. 10-2013-0062097, filed on May 30, 2013, which are incorporated herein by reference in their entireties.

TECHNICAL FIELD

The present invention relates to a method of preparing a hard coating film. More particularly, the present invention relates to a method of preparing a hard coating film having high hardness.

This application claims the benefits of Korean Patent Application Nos. 10-2012-0058634, filed on May 31, 2012, 10-2012-0058635, filed on May 31, 2012, 10-2012-0058636, filed on May 31, 2012, 10-2012-0058637, filed on May 31, 2012, and 10-2013-0062097, filed on May 30, 2013. The entire disclosures of the prior applications are hereby incorporated by references herein in its entirety into this application.

BACKGROUND ART

Recently, with the advance of mobile appliances such as smart phones, tablet PCs and the like, substrates for displays have been required to become thin or slim. Display windows or front panels of such mobile appliances are generally made of glass or reinforced glass which is a material having excellent mechanical properties. However, glass materials suffer from the disadvantage of making the mobile appliances heavy due to their own weight and being apt to be broken by external impacts.

As an alternative to glass, plastic resin films have been researched. A plastic resin film is suitable for the trend of pursuing lighter and slimmer mobile appliances because it is lightweight and does not easily break. Particularly, a film with high hardness and wear resistance is required. In this regard, it is proposed to have a structure in which the substrate is coated with a hard coating layer.

As a method of improving the surface hardness of a hard coating layer, a method of increasing the thickness of the hard coating layer may be considered. In order to ensure the surface hardness of the hard coating layer to such a degree that glass can be replaced by the hard coating layer, it is necessary to adjust the thickness of the hard coating layer. However, as the thickness of the hard coating layer increases, the surface hardness thereof may become higher, whereas the hard coating layer may be wrinkled or curled due to the curing shrinkage thereof and may be easily cracked or exfoliated. Therefore, it is not easy to put the hard coating layer to practical use.

Recently, there haven been proposed several methods of increasing the hardness of a hard coating film and solving the problem of the hard coating film being cracked or curled by the curing shrinkage thereof.

Korean Patent Application Publication No. 2010-0041992 discloses a hard coating film composition, free of monomers, using a binder resin including ultraviolet-curable polyurethane acrylate oligomers. However, this hard coating film has a pencil hardness of about 3H, which is not sufficient to alternate glass panels for displays.

DISCLOSURE

Technical Problem

Accordingly, the present invention has been devised to solve the above-mentioned problems, and an object of the present invention is to provide a method of preparing a hard coating film having high hardness, which is not easily curled, warped or cracked.

Technical Solution

In order to accomplish the above object, an aspect of the present invention provides a method of preparing a hard coating film, including the steps of: applying a first hard coating composition onto one side of a supporting substrate, the first hard coating composition including a first binder, first inorganic particles and a first photoinitiator;

performing a first photocuring by irradiating one side of the supporting substrate which the first coating composition applied on with ultraviolet having a first wavelength until a part of the first binder is crosslinked; applying a second hard coating composition onto the other side of the supporting substrate, the second hard coating composition including a second binder, second inorganic particles and a second photoinitiator; and performing a second photocuring by irradiating the other side of the supporting substrate which the second coating composition applied on, with ultraviolet having a first wavelength and a second wavelength longer than the first length.

Advantageous Effects

As described above, the method according to the present invention makes it possible to easily prepare a hard coating film of high hardness, with a reduced occurrence of curls.

The hard coating film prepared by the method exhibits excellent properties in terms of hardness, scratch resistance, and transparency. In addition, it is of high workability and thus is much less prone to curling and cracking. Therefore, this hard coating film can be usefully applied to front panels or display panels of mobile appliances, display devices, instruments and the like.

BEST MODE FOR CARRYING OUT THE INVENTION

Figure 1:
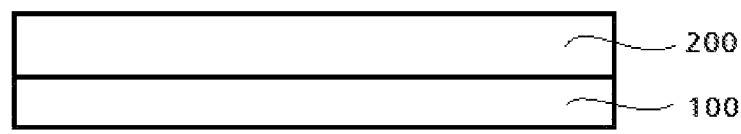
FIGS. 1 to 4 are schematic sectional views showing a process of preparing a hard coating film according to an embodiment of the present invention.

In accordance with an aspect thereof, the present invention provides a method of preparing a hard coating film, including the steps of: applying a first hard coating composition onto one side of a supporting substrate, the first hard coating composition including a first binder, first inorganic particles and a first photoinitiator; performing a first photocuring by irradiating one side of the supporting substrate which the first coating composition applied on with ultraviolet having a first wavelength until a part of the first binder is crosslinked; applying a second hard coating composition onto the other side of the supporting substrate, the second hard coating composition including a second binder, second inorganic particles and a second photoinitiator; and performing a second photocuring by irradiating the other side of the supporting substrate which the second coating composition applied on, with ultraviolet having a first wavelength and a second wavelength longer than the first length.

In the present invention, the terms "first", "second" and the like are used to describe various constituents, only for the purpose of differentiating one constituent from another.

Further, the terms used in the present specification are used only to illustrate the present invention, and do not intend to limit the present invention. The singular number includes the plural number as long as they are apparently different from each other in context. In the present specification, the terms "include", "comprise", "have" and the like designate the existence of features, steps, constituents and combinations thereof, and must be understood that existence or addition of one or more other features, steps, constituents and combinations thereof is not previously excluded.

Further, in the present invention, when it is mentioned that each constituent is formed "on", "over" or "above" each constituent, it means that each constituent is directly formed on each constituent or that another constituent is additionally formed between layers, on an object or on a substrate.

Since the present invention may be modified in various forms, preferred embodiments of the present invention will be described in detail. Although these embodiments have been disclosed for illustrative purposes, it will be appreciated that the present invention is not limited thereto, and those skilled in the art will appreciate that various modifications, additions and substitutions are possible, without departing from the scope and spirit of the invention.

Hereinafter, preferred embodiments of the present invention will be described in detail.

In the method of preparing a hard coating film according to an embodiment of the present invention, first, a hard coating composition including a first binder, first inorganic particles and a first photoinitiator is applied onto one side of a supporting substrate.

In the method of the present invention, so long as it is transparent, any plastic resin, whether capable of being stretched or not, may be used for the supporting substrate which the first hard coating composition will be applied onto, without limitations imposed thereto. According to an embodiment of the present invention, the supporting substrate may include polyethyleneterephthalate (PET), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), triacetylcellulose (TAC), methyl methacrylate (MMA) or the like. The supporting substrate may be a single layer structure, and, if necessary, may be a multilayer structure composed of the same or different materials, but is not particularly limited.

According to an embodiment of the present invention, the supporting substrate may be a multilayered substrate made of polyethyleneterephthalate (PET) or may be a multilayered substrate formed by the coextrusion of polymethylmethacrylate (PMMA) and polycarbonate (PC).

Further, according to an embodiment of the present invention, the supporting substrate may include a copolymer of polymethylmethacrylate (PMMA) and polycarbonate (PC).

The thickness of the supporting substrate may be, but is not limited to, about 30 to about 1,200 µm, or about 50 to about 800 µm.

The first hard coating composition, which is applied onto one side of the supporting substrate, includes a first binder, first inorganic particles and a first photoinitiator.

According to an embodiment of the present invention, the first binder may include a tri- to hexa-functional acrylate-based monomer.

In the present specification, the term "acrylate-based" is intended to encompass acrylate, methacrylate, and derivatives thereof with various substituents.

Examples of the tri- to hexa-functional acrylate-based monomer may include trimethylolpropane triacrylate (TMPTA), trimethylolpropaneethoxy triacrylate (TMPEOTA), glycerin-propoxylated triacrylate (GPTA), pentaerythritol tetraacrylate (PETA), dipentaerythritol hexaacrylate (DPHA), and the like. These tri- to hexa-functional acrylate-based monomers may be used independently or in a combination thereof.

According to an embodiment of the present invention, the first binder may further include a mono- to di-functional acrylate-based monomer.

Examples of the mono- to di-functional acrylate-based monomers may include hydroxyethyl acrylate (HEA), hydroxyethyl methacrylate (HEMA), hexanediol diacrylate (HDDA), tripropyleneglycol diacrylate (TPGDA), ethyleneglycol diacrylate (EGDA), and the like. These mono- to di-functional acrylate-based monomers may also be used independently or in a combination thereof.

According to an embodiment of the present invention, the first binder may be included in an amount of about 35 to about 85 parts by weight or about 45 to about 80 parts by weight, based on 100 parts by weight of the first hard coating composition. When the amount of the first binder in the first hard coating composition is present in above range, a hard coating film, which exhibits high hardness and which is not easily curled or cracked due to its excellent workability, can be formed.

Further, in first the hard coating composition, when the first binder further includes mono- to di-functional acrylate-based monomers, the content ratio of mono- to di-functional acrylate-based monomers to tri- to hexa-functional acrylate-based monomers is not particularly limited. According to an embodiment of the present invention, mono- to di-functional acrylate-based monomers and tri- to hexa-functional acrylate-based monomers may be included such that the weight ratio thereof may be about 1:99 to about 50:50, about 10:90 to about 50:50, or about 20:80 to about 40:60. When mono- to di-functional acrylate-based monomers and tri- to hexa-functional acrylate-based monomers are included at the above weight ratio, the hard coating layer may be imparted with high hardness and flexibility without deteriorating other physical properties such as curl characteristics, light resistance and the like.

According to an embodiment of the present invention, the first binder may further include a photocurable elastic polymer.

In the present specification, the photocurable elastic polymer refers to a polymer material which is elastic and contains a functional group that can be crosslink-polymerized by UV irradiation.

According to an embodiment of the present invention, the photocurable elastic polymer may have an elongation of about 15% or more, for example, about 15 to about 200%, about 20 to about 200%, or about 20 to about 150%, as measured according to ASTM D638.

When the first binder further includes a photocurable elastic polymer, the photocurable elastic polymer is cross-link-polymerized with the tri- to hexa-functional acrylate-based monomers and then cured to form a hard coating layer, which is improved in flexibility and impact resistance.

When the first binder further includes a photocurable elastic polymer, the content ratio of the photocurable elastic polymer to the tri- to hexa-functional acrylate-based monomer is not particularly limited. However, according to an embodiment of the present invention, the photocurable elastic polymer and the tri- to hexa-functional acrylate-based monomer may be included such that the weight ratio thereof may be about 5:95 to about 20:80. When the photocurable elastic polymer and the tri- to hexa-functional acrylate-based monomer are included at the above weight ratio, the hard coating layer may be imparted with high hardness and flexibility without deteriorating other physical properties such as curl characteristics, light resistance and the like, and, particularly, it is possible to prevent the hard coating layer from being damaged by external impact, thus assuring excellent impact resistance.

According to an embodiment of the present invention, the photocurable elastic polymer may be a polymer or oligomer having a weight average molecular weight of about 1,000 to about 600,000 g/mol or about 10,000 to about 600,000 g/mol. The photocurable elastic polymer may be at least one selected from the group consisting of polycaprolactone, a urethane acrylate-based polymer, and polyrotaxane.

Among the polymers used as the photocurable elastic polymer, polycaprolactone is formed by the ring-opening polymerization of caprolactone, and has excellent physical properties such as flexibility, impact resistance, durability and the like.

The urethane acrylate-based polymer retains urethane bonds to have excellent elasticity and durability.

The polyrotaxane is a polymer of rotaxane, a mechanically-interlocked molecular architecture consisting of a dumbbell-shaped molecule which is threaded through a cyclic moiety (macrocycle). The two components of a rotaxane are kinetically trapped since the ends of the dumbbell (stoppers) are larger than the internal diameter of the ring and prevent disassociation of the components since this would require significant distortion of the covalent bonds.

According to an embodiment of the present invention, the photocurable elastic polymer may include polyrotaxane comprising a cyclic moiety (macrocycle) in which lactone compounds with a (meth)acrylate moiety conjugated to the end thereof are bonded each other; a thread moiety held within the macrocycle; and stoppers provided at both ends of the thread moiety so as to prevent dissociation of the macrocycle.

In this case, the cyclic moiety (macrocycle) may be used without limitation as long as it has a size to such degree that it surrounds the thread moiety. The cyclic moiety (macrocycle) may include a functional group such as a hydroxide group, an amino group, a carboxyl group, a thiol group, an aldehyde group or the like, which can react with other polymers or compounds. Specific examples of the cyclic moiety (macrocycle) may include α-cyclodextrin, β-cyclodextrin, γ-cyclodextrin and mixtures thereof.

Further, the thread moiety may be used without limitation as long as it is generally linear in shape with a predetermined weight or greater. Preferably, a polyalkylene compound or a polylactone compound may be used in the thread moiety. Specifically, a polyoxyalkylene compound including an oxyalkylene repetitive unit of 1 to 8 carbon atoms or a polylactone compound including a lactone repetitive unit of 3 to 10 carbon atoms may be used in the thread moiety.

Meanwhile, the stopper may be appropriately adjusted depending on the characteristics of the rotaxane compound to be prepared. For example, the stopper may be at least one selected from the group consisting of a dinitrophenyl group, a cyclodextrin group, an adamantane group, a trityl group, a fluorescein group and a pyrene group.

Since the polyrotaxane has excellent scratch resistance, it can exhibit self-recovery ability when it is externally damaged and scratched.

In the method of the present invention, the first hard coating composition includes first inorganic particles.

According to an embodiment of the present invention, as the first inorganic particles, inorganic nanoparticles having a particle size of about 100 nm or less, about 10 to about 100 nm or about 10 to about 50 nm may be used. For example, silica particles, aluminum oxide particles, titanium oxide particles or zinc oxide particles may be used as the first inorganic particles.

The first hard coating composition includes the first inorganic particles, thus further improving the hardness of a hard coating film.

According to an embodiment of the present invention, the first inorganic particles may be included in an amount of about 10 to about 60 parts by weight or about 20 to about 50 parts by weight, based on 100 parts by weight of the first hard coating composition. When the amount of the first inorganic particles is present in the above range, the effect of improving the hardness of a hard coating film by the addition of inorganic particles without deteriorating the physical properties of the first hard coating composition can be accomplished.

In the method of the present invention, the first hard coating composition includes a first photoinitiator.

The first photoinitiator may be selectively used depending on the wavelength band to be absorbed. According to an embodiment of the present invention, the first photoinitiator may be used in the form of a mixture including all materials that can absorb ultraviolet having a first wavelength band used in the following first photocuring procedure and ultraviolet having a second wavelength band used in the following second photocuring procedure to initiate photopolymerization. Further, according to an embodiment of the present invention, the first photoinitiator may be a photoinitiator that can absorb both ultraviolet having a first wavelength band and ultraviolet having a second wavelength band.

More specifically, examples of the photoinitiator absorbing ultraviolet having a first wavelength band may include 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, and the like. Further, examples of commercially available photoinitiators may include Irgacure 184, Irgacure 500, Irgacure 651, Irgacure 369, Irgacure 907, Darocur 1173, Darocur MBF, and the like.

Examples of the photoinitiator absorbing ultraviolet having a second wavelength band may include diphenyl(2,4,6-trimethylbenzoyl)-phosphine oxide, bis(2,4,6-trimethylbenzoyl)-phenylphophine oxide, and the like. Further, examples of commercially available photoinitiators may include Irgacure 189, Irgacure 907, Esacure KIP 100F, and the like.

The mixing ratio of the photoinitiator absorbing ultraviolet having a first wavelength band to the photoinitiator absorbing ultraviolet having a second wavelength band is not particularly limited, and may be suitably adjusted at need.

Among these photoinitiators, Darocur TPO, Irgacure 500, Irgacure 907 and Esacure KIP 100F can absorb both ultraviolet having a first wavelength band and ultraviolet having a second wavelength band. Therefore, they may be each independently used.

According to an embodiment of the present invention, the first photoinitiator may be included in an amount of about 0.5 to about 10 parts by weight or about 1 to about 5 parts by weight, based on 100 parts by weight of the first hard coating composition. When the amount of the first photoinitiator is present in the above range, crosslink-photopolymerization can be sufficiently conducted without deteriorating the physical properties of the hard coating film.

Meanwhile, in the method of preparing a hard coating film according to the present invention, the first hard coating composition may further include commonly-used additives such as a surfactant, a yellowing inhibitor, a leveling agent, an antifouling agent and the like in addition to the above-mentioned components. Here, the content of the additive is not particularly limited because the content thereof may be variously adjusted while not deteriorating the physical properties of the first hard coating composition.

According to an embodiment of the present invention, for example, the first hard coating composition may include a surfactant as an additive. The surfactant may be a mono- to di-functional fluorine-based acrylate, a fluorine-based surfactant or a silicon-based surfactant. Further, the first hard coating composition may include a yellowing inhibitor as an additive. The yellowing inhibitor may be a benzophenone compound or a benzotriazole compound.

Further, in the method of the present invention, the first hard coating composition may be used in a solvent-free form, but may further include an organic solvent selectively in order to adjust the viscosity and fluidity of the first hard coating composition at the time of coating the supporting substrate with this composition and to improve the coatability of this composition to the supporting substrate.

Examples of the organic solvent may include: alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglyco monoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used independently or in a mixture thereof.

In the method of the present invention, when the organic solvent is additionally included in the first hard coating composition, the organic solvent may be added such that the weight ratio of first hard coating composition: organic solvent is about 70:30 to about 99:1. As such, when the first hard coating composition has a high solid content, the viscosity of the first hard coating composition increases, and thus thick coating can be performed, thereby forming a thick hard coating layer having a thickness of 50 μm or more.

According to an embodiment of the present invention, the viscosity of the first hard coating composition is not particularly limited as long as it has suitable fluidity and coatability, but the first hard coating composition can exhibit high viscosity because it has a relatively high solid content. For example, the first hard coating composition may have a viscosity of about 100 to about 1,200 cps, about 150 to about 1,200 cps or about 300 to about 1,200 cps at 25° C.

The first hard coating composition including the above-mentioned components is applied onto one side of the supporting substrate. In this case, the method of applying the first hard coating composition is not particularly limited as long as it can be used in the related field. For example, the first hard coating composition may be applied by bar coating, knife coating, roll coating, blade coating, die coating, micro-gravure coating, comma coating, slot die coating, lip coating, solution casting or the like.

Further, the first hard coating composition may be applied onto one side of the supporting substrate such that a hard coating layer formed by completely curing the applied first hard coating composition has a thickness of about 50 to about 150 μm or about 70 to about 100 μm. When the first hard coating layer is applied as above, a hard coating film having high hardness can be prepared without the formation of curls or cracks.

After the first hard coating composition is applied, the procedure of stabilizing the surface of the applied first hard coating composition may be selectively performed. This stabilization procedure may be performed by heat-treating the supporting substrate coated with the first hard coating composition at predetermined temperature. Thus, the surface of the applied first hard coating composition is flattened, and volatile components included in the first hard coating composition are volatilized, thus stabilizing the surface thereof.

Subsequently, one side of the supporting substrate which the first coating composition applied on is irradiated with ultraviolet having a first wavelength to perform a first photocure the first coating composition.

The ultraviolet having a first wavelength may be a short-wavelength ultraviolet having a wavelength of about 280 to less than about 320 nm.

The first photocuring procedure may be performed until a part of the first binder included in the first hard coating composition is crosslinked. Here, the sentence "a part of the first binder is crosslinked" means that the first binder is partially crosslinked at a ratio of less than 100% when the case that the first binder is completely crosslinked is indicated by 100%. For example, according to an embodiment of the present invention, the first photocuring procedure may be performed until about 30 to about 60 mol % or about 40 to about 50 mol % of photocurable functional groups included in the first binder are crosslinked.

The degree of crosslinkage of the first binder may be evaluated by measuring the number of moles of functional groups, that is, double bonds (C=C) remaining in the first binder using infrared (IR) after photocuring the first hard coating composition and then comparing it with the amount of functional groups included in the first binder before photocuring the first hard coating composition.

According to the method of preparing a hard coating film of the present invention, the first binder of the first hard coating composition applied on one side of the supporting substrate is not completely cured at once but partially cured (for example, about 30 to about 60 mol % or about 40 to about 50 mol %).

Generally, an acrylate-based binder monomer may cause a curing shrinkage phenomenon or curl phenomenon in which a supporting substrate is rolled up together with a coating layer due to shrinkage attributable to curing. The curl phenomenon is a phenomenon in which the edge or the like of a planar film is curvilinearly warped or rolled up when the planar film is spread on a flat plate, and this curl phenomenon occurs when an acrylate-based binder monomer is shrunk in the procedure of photocuring this acrylate-based binder monomer by ultraviolet irradiation.

Particularly, in order to use a hard coating film in covers for mobile terminals such as smart phones or covers for tablet PCs, it is important that the hardness of a hard coating film is improved to such a degree that the hard coating film replaces glass. In this case, in order to improve the hardness of the hard coating film, basically, the thickness of a hard coating layer must be increased to predetermined thickness, for example, 50 µm or more, 70 µm or more or 100 µm or more. However, as the thickness of the hard coating layer is increased, the curl phenomenon caused by curing shrinkage is also increased, so the adhesion of the hard coating layer to the supporting substrate is decreased, and the hard coating film is easily rolled up. For this reason, a process of flattening the supporting substrate may be additionally performed, but this process is problematic in that the hard coating layer is cracked. Therefore, it is not easy to prepare a hard coating film having high hardness that can replace glass without deteriorating the physical properties thereof.

According to the method of preparing a hard coating film of the present invention, in the step of first photocuring by irradiating the first coating composition applied on one side of the supporting substrate with ultraviolet having a first wavelength to photocure the first coating composition, the first hard coating composition is not completely cured at once but partially cured until about 30 to about 60 mol % of the first binder is cured, thereby reducing the curing shrinkage of the first hard coating composition. Therefore, a hard coating film exhibiting excellent physical and optical properties without the formation of curls or cracks can be prepared.

According to an embodiment of the present invention, for example, when the supporting substrate coated with the first hard coating composition, which was cured in the first photocuring step, is cut to a size of 10 cm×10 cm and then placed on a plane, the maximum distance at which each edge of the supporting substrate is spaced apart from the plane may be about 30 mm, about 25 mm or about 20 mm.

Further, when reminder of the partially cured first hard coating composition is secondarily cured on the other side of the supporting substrate in the following second photocuring step, the other side thereof not being coated with the first hard coating composition, curls formed in the first photocuring step are set off in a direction opposite thereto, thus obtaining a flat hard coating film.

For example, the irradiation rate of the ultraviolet having a first wavelength may be about 20 to about 600 mJ/cm$^2$ or about 50 to about 500 mJ/cm$^2$. The light source for ultraviolet irradiation is not particularly limited as long as it can be used in the related field. For example, as the light source of ultraviolet irradiation, a high-pressure mercury lamp, a metal halide lamp, a black light lamp, a fluorescent lamp or the like may be used. When the applied first hard coating composition is irradiated with ultraviolet at the above irradiation rate for about 30 seconds to about 15 minutes or for about 1 to about 10 minutes, this first hard coating composition may be photocured.

Next, after the step of applying and photocuring the first hard coating composition is performed, a second hard coating composition is applied onto the other side of the supporting substrate. The second hard coating composition includes a second binder, second inorganic particles and a second photoinitiator.

According to an embodiment of the present invention, the second binder may be included in an amount of about 35 to about 85 parts by weight or about 45 to about 80 parts by weight, based on 100 parts by weight of the second hard coating composition. When the amount of the second binder in the second hard coating composition is present in the above range, a hard coating film, which exhibits high hardness and which is not easily curled or cracked due to its excellent workability, can be formed.

According to an embodiment of the present invention, the second binder includes a tri- to hexa-functional acrylate-based monomer, and may be the same as or different from the first binder. Further, the second binder may further include a mono- to di-functional acrylate-based monomer.

According to an embodiment of the present invention, the second binder may include a tri- to hexa-functional acrylate-based monomer.

According to an embodiment of the present invention, the second binder may further include a mono- to di-functional acrylate-based monomer.

According to an embodiment of the present invention, the second binder may further include a photocurable elastic polymer.

The tri- to hexa-functional acrylate-based monomer, mono- to di-functional acrylate-based monomer and photocurable elastic polymer included in the second binder were aforementioned, and may be each independently the same as or different from those included in the first binder.

In the method of preparing a hard coating film according to the present invention, the second hard coating composition includes second inorganic particles.

According to an embodiment of the present invention, as the second inorganic particles, inorganic nanoparticles having a particle size of about 100 nm or less, about 10 to about 100 nm or about 10 to about 50 nm may be used. For example, silica particles, aluminum oxide particles, titanium oxide particles or zinc oxide particles may be used as the second inorganic particles.

The second hard coating composition includes the second inorganic particles, thus further improving the hardness of a hard coating film.

According to an embodiment of the present invention, the second inorganic particles may be included in an amount of about 10 to about 60 parts by weight or about 20 to about 50 parts by weight, based on 100 parts by weight of the second hard coating composition. When the amount of the second inorganic particles is present in the above range, the effect of improving the hardness of a hard coating film by the addition of inorganic particles without deteriorating the physical properties of the second hard coating composition can be accomplished.

In the method of the present invention, the second hard coating composition includes a second photoinitiator.

The second photoinitiator may be used without limitation as long as it can absorb the ultraviolet having a first wavelength band used in the following second photocuring step to initiate photopolymerization. More specifically, examples of the photoinitiator absorbing the ultraviolet having a first wavelength band may include 1-hydroxy-cyclohexyl-phenyl ketone, 2-hydroxy-2-methyl-1-phenyl-1-propanone, 2-hydroxy-1-[4-(2-hydroxyethoxy)phenyl]-2-methyl-1-propanone, methylbenzoylformate, α,α-dimethoxy-α-phenylacetophenone, 2-benzoyl-2-(dimethylamino)-1-[4-(4-morpholinyl)phenyl]-1-butanone, 2-methyl-1-[4-(methylthio)phenyl]-2-(4-morpholinyl)-1-propanone, and the like. Further, examples of commercially available photoinitiators may include Irgacure 184, Irgacure 500, Irgacure 651, Irgacure 369, Irgacure 907, Darocur 1173, Darocur MBF, and the like.

Further, as the second photoinitiator, Darocur TPO, Irgacure 500, Irgacure 907 or Esacure KIP 100F, which is a material that can absorb both the ultraviolet having a first wavelength band and the ultraviolet having a second wavelength band, may be used.

According to an embodiment of the present invention, the second photoinitiator may be included in an amount of about 0.5 to about 10 parts by weight or about 1 to about 5 parts by weight, based on 100 parts by weight of the second hard coating composition. When the amount of the second photoinitiator is present in the above range, crosslink-photopolymerization can be sufficiently conducted without deteriorating the physical properties of the hard coating film.

Meanwhile, in the method of preparing a hard coating film according to the present invention, the second hard coating composition may further include commonly-used additives such as a surfactant, a yellowing inhibitor, a leveling agent, an antifouling agent and the like in addition to the above-mentioned components. Here, the content of the additive is not particularly limited because the content thereof may be variously adjusted while not deteriorating the physical properties of the second hard coating composition.

According to an embodiment of the present invention, for example, the second hard coating composition may include a surfactant as an additive. The surfactant may be a mono- to di-functional fluorine-based acrylate, a fluorine-based surfactant or a silicon-based surfactant. Further, the second hard coating composition may include a yellowing inhibitor as an additive. The yellowing inhibitor may be a benzophenone compound or a benzotriazole compound.

The second hard coating composition may further include an organic solvent selectively in order to adjust the viscosity and fluidity of the second hard coating composition at the time of coating the supporting substrate with this composition and to improve the coatability of this composition to the supporting substrate.

Further, in the method of preparing a hard coating film according to the present invention, the second hard coating composition may be used in a solvent-free form, but may further include an organic solvent selectively in order to adjust the viscosity and fluidity of the second hard coating composition at the time of coating the supporting substrate with this composition and to improve the coatability of this composition to the supporting substrate.

Examples of the organic solvent may include: alcohols such as methanol, ethanol, isopropyl alcohol, butanol and the like; alkoxy alcohols such as 2-methoxy ethanol, 2-ethoxy ethanol, 1-methoxy-2-propanol and the like; ketones such as acetone, methyl ethyl ketone, methyl isobutyl ketone, methyl propyl ketone, cyclohexanone and the like; ethers such as propyleneglycol monopropyl ether, propyleneglycol monomethyl ether, ethyleneglyco monoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, diethyleneglycol-2-ethylhexyl ether and the like; and aromatic solvents such as benzene, toluene, xylene and the like. These organic solvents may be used independently or in a mixture thereof.

In the method of preparing a hard coating film according to the present invention, when the organic solvent is additionally included in the second hard coating composition, the organic solvent may be added such that the weight ratio of second hard coating composition: organic solvent is about 70:30 to about 99:1. As such, when the second hard coating composition has a high solid content, the viscosity of the second hard coating composition increases, and thus thick coating can be performed, thereby forming a thick hard coating layer having a thickness of 50 μm or more.

According to an embodiment of the present invention, the second hard coating composition, the same as the first hard coating composition, may have a viscosity of about 100 to about 1,200 cps, about 150 to about 1,200 cps or about 300 to about 1,200 cps at 25° C.

The second hard coating composition including the above-mentioned components is applied onto the other side of the supporting substrate, that is, a side opposite to the side thereof coated with the first hard coating composition. In this case, the method of applying the second hard coating composition is not particularly limited as long as it can be used in the related field. For example, the first hard coating composition may be applied by bar coating, knife coating, roll coating, blade coating, die coating, micro-gravure coating, comma coating, slot die coating, lip coating, solution casting or the like.

Further, the second hard coating composition may be applied onto one side of the supporting substrate such that a hard coating layer formed by curing the applied second hard coating composition has a thickness of about 50 to about 150 μm, or about 70 to about 100 μm. When the second hard coating layer is applied as above, a hard coating film having high hardness can be prepared without the formation curls or cracks.

After the second hard coating composition is applied, the procedure of stabilizing the surface of the applied second hard coating composition may be selectively performed. This procedure may be performed by heat-treating the supporting substrate coated with the second hard coating composition at predetermined temperature. Thus, the surface of the applied second hard coating composition is flattened, and volatile components included in the second hard coating composition are volatilized, thus stabilizing the surface thereof.

Subsequently, the other side of the supporting substrate coated with the second coating composition is irradiated with ultraviolet having both first wavelength and second wavelength longer than the first wavelength to perform a second photocure the second coating composition. According to an embodiment of the present invention, the first wavelength may be about 280 to less than about 320 nm, and the second wavelength may be about 320 to about 400 nm.

The ultraviolet having the first wavelength photocures the second hard coating composition, and simultaneously the ultraviolet having the second wavelength higher than the first wavelength penetrates the supporting substrate coated with the second hard coating composition to reaches the first hard coating composition located opposite to the second hard coating composition to photocure the first hard coating composition. In this case, the first hard coating composition partially photocured in the above first photocuring step may be completely photocured by the second photocuring step. Further, in the second photocuring step, the irradiation of ultraviolet is conducted from a side opposite to the side of the supporting substrate coated with the first hard coating composition, and thus curls formed due to the curing contraction in the first photocuring step are set off in a direction opposite to the first hard coating composition, thus obtaining a flat hard coating film. Therefore, an additional flattening procedure is not needed.

As described above, according to the method of preparing a hard coating film of the present invention, two-step photocuring process including the steps of: the first photocuring step of partially photocuring the first binder of the first hard coating composition applied on one side of the supporting substrate; and the second photocuring step of photocuring the second binder of the second hard coating composition applied on the other side of the supporting substrate and photocuring the residual first binder are performed, thus preventing the curls or cracks occurring when a hard coating composition is applied thickly. Therefore, a hard coating film exhibiting excellent physical and optical properties can be prepared without the formation of curls or cracks.

When the hard coating film obtained by the method of the present invention is exposed to a temperature of 50° C. or more and a humidity of 80% or more for 70 hours or more and then placed on a plane, the maximum distance at which each edge of the hard coating film is spaced apart from the plane may be about 1.0 mm or less, about 0.6 mm or less or about 0.3 mm or less. More specifically, when the hard coating film is exposed to a temperature of 50 to 90° C. and a humidity of 80 to 90% for 70 to 100 hours or more and then placed on a plane, the maximum distance at which each edge of the hard coating film is spaced apart from the plane may be about 1.0 mm or less, about 0.6 mm or less or about 0.3 mm or less.

FIGS. 1 to 4 are schematic sectional views showing a process of preparing a hard coating film according to an embodiment of the present invention.

Referring to FIG. 1, first, a first hard coating composition 200 is applied onto one side of a supporting substrate 100.

The components of the first coating composition 200 were aforementioned. The method of applying the first hard coating composition 200 is not particularly limited as long as it can be used in the related field. For example, the first hard coating composition 200 may be applied by bar coating, knife coating, roll coating, blade coating, die coating, micro-gravure coating, comma coating, slot die coating, lip coating, solution casting or the like. Further, the first hard coating composition 200 may be applied onto one side of the supporting substrate such that a hard coating layer formed by completely curing the applied first hard coating composition 200 has a thickness of about 50 to about 150 μm, or about 70 to about 100 μm.

Figure 2:
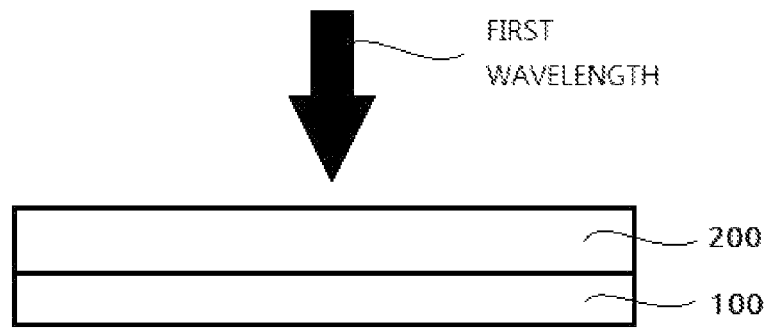

FIG. 2 is a sectional view showing the step of irradiating the first coating composition 200 applied on one side of the supporting substrate 100 with ultraviolet having a first wavelength to perform a first photocure.

Referring to FIG. 2, the first coating composition 200 applied on one side of the supporting substrate 100 is irradiated with ultraviolet having a first wavelength to photocure the first coating composition 200. The ultraviolet having a first wavelength may be a short-wavelength ultraviolet having a wavelength of about 280 to less than about 320 nm. According to the method of preparing a hard coating film of the present invention, the first binder of the first hard coating composition 200 applied on one side of the supporting substrate 100 is not completely cured at once but partially cured (for example, about 30 to about 60 mol % or about 40 to about 50 mol %).

Figure 3:
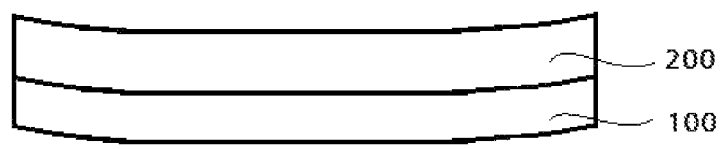

FIG. 3 is a sectional view showing the partially-photocured first hard coating composition 200.

Referring to FIG. 3, since the first coating composition 200 including the first binder is shrunk due to the curing in the first photocuring step, a curing contraction phenomenon, a curing shringkage, or curl phenomenon in which a supporting substrate is rolled up due to the shrinkage attributable to curing occurs.

According to an embodiment of the present invention, for example, when the supporting substrate coated with the first hard coating composition 200, which was cured in the first photocuring step, is cut to a size of 10 cm×10 cm and then placed on a plane, the maximum distance at which each edge of the supporting substrate is spaced apart from the plane may be about 30 mm, about 25 mm or about 20 mm.

Figure 4:
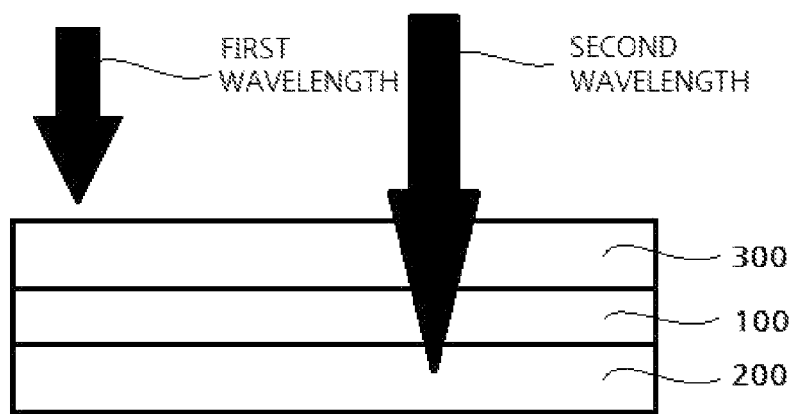

FIG. 4 is a sectional view showing the steps of: applying a second hard coating composition 300 onto the other side of the supporting substrate 100; and irradiating the other side of the supporting substrate 100 coated with the second coating composition 300 with ultraviolets having a first wavelength and a second wavelength to perform a second photocure.

The components of the second hard coating composition 300 and the application method thereof were aforementioned. Further, the second hard coating composition 300 may be applied onto the other side of the supporting substrate 100 such that a hard coating layer formed by completely curing the applied second hard coating composition 300 has a thickness of about 50 to about 150 μm or about 70 to about 100 μm.

According to an embodiment of the present invention, the first wavelength may be about 280 to less than about 320 nm, and the second wavelength may be about 320 to about 400 nm.

The ultraviolet having a first wavelength photocures the second hard coating composition 300, and the ultraviolet having a second wavelength higher than the first wavelength penetrates the supporting substrate 100 coated with the second hard coating composition 300 to reaches the first hard coating composition 200 located opposite to the second hard coating composition 300 to photocure the first hard coating composition 200. In this case, the first hard coating composition 200 partially photocured in the above first photocuring step may be completely photocured by the second photocuring step. Further, in the second photocuring step, the irradiation of ultraviolet is conducted from a side opposite to the side of the supporting substrate 100 coated with the first hard coating composition 200, and thus curls formed due to the curing shrinkage in the first photocuring step are set off in a direction opposite thereto, thus obtaining a flat hard coating film.

The hard coating film obtained by the method of the present invention can be usefully used in various fields because it exhibits high hardness, scratch resistance, transparency, durability, light resistance and light transmission.

For example, the hard coating film obtained by the method of the present invention may have a pencil hardness of 7H or more, 8H or more or 9H or more under a load of 1 kg.

Further, when a friction tester is mounted with a steel wool #0000 and then the steel wool #0000 is reciprocated on the hard coating film of the present invention 400 times under a load of 500 g, two or less scratches may be formed on the hard coating film.

Further, the hard coating film obtained by the method of the present invention may have a light transmittance of 91.0% or more or 92.0% or more and a haze of 1.0% or less, 0.5% or less or 0.4% or less.

Further, when the hard coating film obtained by the method of the present invention is exposed to a temperature of 50° C. or more and a humidity of 80% or more for 70 hours or more and then placed on a plane, the maximum distance at which each edge of the hard coating film is spaced apart from the plane may be about 1.0 mm or less, about 0.6 mm or less or about 0.3 mm or less. More specifically, when the hard coating film is exposed to a temperature of 50 to 90° C. and a humidity of 80 to 90% for 70 to 100 hours or more and then placed on a plane, the maximum distance at which each edge of the hard coating film is spaced apart from the plane may be about 1.0 mm or less, about 0.6 mm or less or about 0.3 mm or less.

Further, the hard coating film obtained by the method of the present invention may have an initial color b* value of 1.0 or less. Further, when the hard coating film is exposed to UV-B for 72 hours or more by an ultraviolet lamp, the difference between the initial color b* value of the hard coating film and the color b* value of the hard coating film exposed to UV-B may be 0.5 or less or 0.4 or less.

As described above, the hard coating film prepared by the method of the present invention can be used in various fields. For example, the hard coating film of the present invention can be used in touch panels of mobile terminals, smart phones or tablet PCs and covers of displays or devices.

Hereinafter, the present invention will be described in more detail with reference to the following Examples. However, these Examples are set forth to illustrate the present invention, and the scope of the present invention is not limited thereto.

EXAMPLES

Preparation Example 1

Preparation of Photocurable Elastic Polymer

In a reactor, 50 g of a caprolactone-grafted polyrotaxane polymer [A1000, Advanced Soft Material INC] was mixed with 4.53 g of Karenz-AOI [2-acryloylethyl isocyanate, Showadenko Inc.], 20 mg of dibutyltin dilaurate [DBTDL, Merck Corp.], 110 mg of hydroquinone monomethylene ether and 315 g of methyl ethyl ketone. Then, the mixture was reacted at 70° C. for 5 hours to obtain polyrotaxane in which polylactone with an acrylate moiety conjugated to the end thereof acted as the macrocycle while cyclodextrin was positioned as the stopper.

The weight average molecular weight of the obtained polyrotaxane was 600,000 g/mol, and the elongation thereof was 20%, as measured according to ASTM D638.

Example 1

2 g of hydroxyethylacrylate (HEA), 8 g of a silica-dipentaerythritolhexacrylate (DPHA) composite (silica 3.2 g, DPHA 4.8 g) dispersed with silica nanoparticles having a particle size of 20~30 nm in an amount of 40 wt %, 0.2 g of a photoinitiator (brand name: Darocur TPO), 0.1 g of a benzotriazole-based yellowing inhibitor (brand name: Tinuvin 400) and 0.05 g of a fluorine-based surfactant (brand name: FC4430) were mixed to prepare a first hard coating composition. A second hard coating film was also prepared in the same manner.

The first hard coating composition was applied onto one side of a PET supporting substrate having a size of 15 cm×20 cm and a thickness of 188 μm. Then, the PET supporting substrate coated with the first hard coating composition was irradiated with ultraviolet having a wavelength of 290~320 nm using a metal halide lamp to photocure the first hard coating composition until 40 mol % of a binder in the first hard coating composition is cured.

The second hard coating composition was applied onto the other side of the PET supporting substrate. Then, the PET supporting substrate coated with the second hard coating composition was irradiated with ultraviolet having a wavelength of 280~350 nm using a black light fluorescent lamp to photocure the second hard coating composition, thereby preparing a hard coating film. Here, the thickness of each of the first and second hard coating layers formed on both sides of the PET supporting substrate was 100 μm.

Example 2

A hard coating film was prepared in the same manner as in Example 1, except that 2 g of 9-ethyleneglycol diacrylate (9-EGDA) was used instead of 2 g of hydroxyethylacrylate (HEA).

Example 3

A hard coating film was prepared in the same manner as in Example 1, except that 1 g of hydroxyethylacrylate (HEA) and 9 g of a silica-trimethylolpropanetriacylate (TMPTA) composite (silica 4.5 g, TMPTA 4.5 g) dispersed with silica nanoparticles having a particle size of 20~30 nm in an amount of about 50 wt % were used instead of 2 g of hydroxyethylacrylate (HEA) and 8 g of a silica-dipentaerythritolhexacrylate (DPHA) composite.

Example 4

2 g of hydroxyethylacrylate (HEA), 8 g of a silica-dipentaerythritolhexacrylate (DPHA) composite (silica 3.2 g, DPHA 4.8 g) dispersed with silica nanoparticles having a particle size of 20~30 nm in an amount of about 40 wt %, 0.2 g of a photoinitiator (brand name: Darocur TPO), 0.1 g of a benzotriazole-based yellowing inhibitor (brand name: Tinuvin 400) and 0.05 g of a fluorine-based surfactant (brand name: FC4430) were dissolved in 2 g of methyl ethyl ketone (MEK) to prepare first and second hard coating compositions.

The first hard coating composition was applied onto one side of a PC/PMMA coextruded supporting substrate having a size of 15 cm×20 cm and a thickness of 180 μm. Thereafter, a hard coating film was prepared in the same manner as in Example 1.

Example 5

A hard coating film was prepared in the same manner as in Example 1, except that a TAC resin supporting substrate having a size of 15 cm×20 cm and a thickness of 80 μm was used as a supporting substrate.

Example 6

9 g of a silica-dipentaerythritolhexacrylate (DPHA) composite (silica 3.6 g, DPHA 5.4 g) dispersed with silica nanoparticles having a particle size of 20~30 nm in an amount of about 40 wt %, 1 g of polyrotaxane of Preparation Example 1, 0.2 g of a photoinitiator (brand name: Darocur TPO), 0.1 g of a benzotriazole-based yellowing inhibitor (brand name: Tinuvin 400) and 0.05 g of a fluorine-based surfactant (brand name: FC4430) were mixed to prepare a first hard coating composition. A second hard coating film was also prepared in the same manner.

The first hard coating composition was applied onto one side of a PET supporting substrate having a size of 15 cm×20 cm and a thickness of 188 μm. Then, the PET supporting substrate coated with the first hard coating composition was irradiated with ultraviolet having a wavelength of 290~320 nm using a metal halide lamp to photocure the first hard coating composition until 40 mol % of a binder in the first hard coating composition is cured.

The second hard coating composition was applied onto the other side of the PET supporting substrate. Then, the PET supporting substrate coated with the second hard coating composition was irradiated with ultraviolet having a wavelength of 280~350 nm using a black light fluorescent lamp to photocure the second hard coating composition, thereby preparing a hard coating film. Here, the thickness of each of the first and second hard coating layers formed on both sides of the PET supporting substrate was 100 μm.

Example 7

A hard coating film was prepared in the same manner as in Example 6, except that 1 g of a urethane acrylate-based polymer (brand name: UA200PA, Shinnakamura Chemicals Corp., weight average molecular weight: 2,600 g/mol, elongation measured based on ASTM D638: 170%) was used instead of 1 g of polyrotaxane of Preparation Example 1.

Example 8

A hard coating film was prepared in the same manner as in Example 6, except that 1 g of a urethane acrylate-based polymer (brand name: UA340P, Shinnakamura Chemicals Corp., weight average molecular weight: 13,000 g/mol, elongation measured based on ASTM D638: 150%) was used instead of 1 g of polyrotaxane of Preparation Example 1.

Comparative Example 1

A hard coating film was prepared in the same manner as in Example 1, except that only 10 g of dipentaerythritol-hexacrylate (DPHA) was used instead of 2 g of hydroxyethylacrylate (HEA) and 8 g of a silica-dipentaerythritol-hexacrylate (DPHA) composite.

Comparative Examples 2 and 3

Hard coating films were prepared in the same manner as in Example 1, except that the components of first and second hard coating compositions were changed as given in Table 1 below.

The components and contents of the first and second hard coating compositions of Examples 1 to 8 and Comparative Examples 1 to 3 are summarized in Table 1 below.

TABLE 1

| No. | Monomers for binder 3-6 functional acrylate | Monomers for binder 1-2 functional acrylate | Photo-curable elastic polymer (unit: g) | Inorganic particles (unit: g) | Supporting substrate |
|---|---|---|---|---|---|
| Ex. 1 | DPHA 4.8 g | HEA 2 g | 0 | 3.2 | PET |
| Ex. 2 | DPHA 4.8 g | 9-EGDA 2 g | 0 | 3.2 | PET |
| Ex. 3 | DPHA 4.5 g | HEA 1 g | 0 | 4.5 | PET |
| Ex. 4 | DPHA 4.8 g | HEA 2 g | 0 | 3.2 | PC/PMMA |
| Ex. 5 | DPHA 4.8 g | HEA 2 g | 0 | 3.2 | TAC |
| Ex. 6 | DPHA 5.4 g | 0 | poly-rotaxane 1 g | 3.6 | PET |
| Ex. 7 | DPHA 5.4 g | 0 | UA200PA 1 g | 3.6 | PET |
| Ex. 8 | DPHA 5.4 g | 0 | UA340P 1 g | 3.6 | PET |
| Comp. Ex. 1 | DPHA 10 g | 0 | 0 | 0 | PET |
| Comp. Ex. 2 | DPHA 8 g | HEA 2 g | 0 | 0 | PET |
| Comp. Ex. 3 | DPHA 5 g | HEA 2 g | 0 | 0 | PET |

Test Example

Measuring Method

1) Pencil Hardness

Pencil hardness was evaluated according to the Japanese Standard JIS K5400. In this regard, a pencil hardness meter was reciprocated three times on each of the hard coating film under a load of 1.0 kg to determine the hardness at which no scratches were observed.

2) Scratch Resistance

After being loaded to a friction tester, a steel wool (#0000) was reciprocated 400 times on each of the hard coating films under a load of 0.5 kg, and scratches thus formed were counted. Evaluation was made of the scratch resistance of the films by marking ○ for two or less scratches, Δ for two to less than five scratches, and × for five or more scratches.

3) Curl Property

When a supporting substrate coated with a first hard coating composition was photocured, cut to a size of 10 cm×10 cm and then placed on a plane, the maximum distance at which each edge of the supporting substrate is spaced apart from the plane was measured.

4) Light Resistance

Differences in color b* value of the hard coating films were measured before and after exposure to UVB from UV lamp for 72 hours.

5) Transmittance and Haze

The transmittance and haze of the hard coating films were measured using a spectrophotometer (brand name: COH-400).

6) Curl Property to Temperature and Humidity

When each of the hard coating films was cut to a size of 10 cm×10 cm, stored in a chamber at a temperature of 85° C. and a humidity of 85% for 72 hours and then placed on a plane, the maximum distance at which each edge of the hard coating film was spaced apart the plane was measured.

7) Cylindrical Bending Test

Each of the hard coating films was wound on a cylindrical mandrel having a diameter of 3 cm, and then it was determined whether or not each of the hard coating film was cracked. IF each of the hard coating films was not cracked, it was evaluated as OK, and if it was cracked, it was evaluated as X.

8) Impact Resistance

The impact resistance of each of the hard coating films was evaluated by determining whether or not each of the hard coating films was cracked when a 22 g steel ball was dropped thereon from a height of 40 cm. When each of the hard coating films was not cracked, it is indicated by OK, and when it was cracked, it is indicated by X.

The results of the physical properties measured in the hard coating films are summarized in Tables 2 and 3 below.

TABLE 2

|  | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- |
| Pencil hardness | 8H | 9H | 9H | 8H | 8H | 9H | 9H | 8H |
| Scratch resistance | ○ | ○ | ○ | ○ | ○ | ○ | ○ | ○ |
| Curl property | 15 mm | 18 mm | 13 mm | 13 mm | 15 mm | 15 mm | 10 mm | 12 mm |
| Light resistance | 0.20 | 0.22 | 0.15 | 0.20 | 0.20 | 0.20 | 0.25 | 0.21 |
| Transmittance | 92.2 | 92.3 | 92.4 | 92.5 | 92.3 | 92.0 | 92.3 | 91.8 |
| Haze | 0.4 | 0.4 | 0.3 | 0.2 | 0.4 | 0.3 | 0.2 | 0.3 |
| Bending test | OK | OK | OK | OK | OK | OK | OK | OK |
| Curl property to temperature and humidity | 0.3 mm | 0.2 mm | 0.2 mm | 0.3 mm | 0.3 mm | 0.0 mm | 0.0 mm | 0.0 mm |
| Impact resistance | OK | OK | OK | OK | OK | OK | OK | OK |

TABLE 3

|  | Comp. Ex. 1 | Comp. Ex. 2 | Comp. Ex. 3 |
| --- | --- | --- | --- |
| Pencil hardness | 6H | 5H | 3H |
| Scratch resistance | ○ | Δ | X |
| Curl property | 22 mm | 10 mm | 13 mm |
| Light resistance | 0.25 | 0.21 | 0.16 |
| Transmittance | 92.0 | 91.7 | 92.1 |
| Haze | 0.5 | 0.4 | 0.4 |
| Bending test | X | OK | OK |
| Curl property to temperature and humidity | 0.5 mm | 0.4 mm | 0.3 mm |
| Impact resistance | X | OK | OK |

As given in Table 2 above, it can be ascertained that all of the hard coating films obtained by the methods of Examples 1 to 8 exhibit good physical properties.

REFERENCE NUMERALS

100: supporting substrate
200: first hard coating composition
300: second hard coating composition

The invention claimed is:

1. A method of preparing a hard coating film having a first hard coating layer and a second hard coating layer, comprising the steps of:
   applying a first hard coating composition onto one side of a supporting substrate, the first hard coating composition including a first binder, first inorganic particles and a first photoinitiator;
   performing a first photocuring by irradiating one side of the supporting substrate which the first coating composition applied on with ultraviolet having a first wavelength until a part of the first binder is crosslinked;
   applying a second hard coating composition onto the other side of the supporting substrate, the second hard coating composition including a second binder, second inorganic particles and a second photoinitiator; and
   performing a second photocuring by irradiating the other side of the supporting substrate which the second coating composition applied on, with ultraviolet having a first wavelength and a second wavelength longer than the first wavelength,
   wherein each hard coating layer has a thickness of 50 to 150 μm, and
   wherein the hard coating film has a pencil hardness of 7H or more under a load of 1 kg.

2. The method of claim 1, wherein the first photocuring is performed until 30 to 60 mol % of the first binder are crosslinked.

3. The method of claim 1, wherein the ultraviolet having the second wavelength in the second photocuring step photocures the first binder.

4. The method of claim 1, wherein the ultraviolet having the first wavelength in the second photocuring step photocures the second binder.

5. The method of claim 1, wherein the first wavelength is 280 to less than 320 nm.

6. The method of claim 1, wherein the second wavelength is 320 to 400 nm.

7. The method of claim 1, wherein the first and second binders are the same or different from one another and independently include a tri- to hexa-functional acrylate-based monomer.

8. The method of claim 7, wherein the tri- to hexa-functional acrylate-based monomer includes at least one selected from the group consisting of trimethylolpropane triacrylate (TMPTA), trimethylolpropaneethoxy triacrylate (TMPEOTA), glycerin-propoxylated triacrylate (GPTA), pentaerythritol tetraacrylate (PETA), and dipentaerythritol hexaacrylate (DPHA).

9. The method of claim 7, wherein the first and second binders are the same or different from one another and independently further include a mono- to di-functional acrylate-based monomer.

10. The method of claim 9, wherein the mono- to di-functional acrylate-based monomer includes at least one selected from the group consisting of hydroxyethyl acrylate (HEA), hydroxyethyl methacrylate (HEMA), hexanediol diacrylate (HDDA), tripropyleneglycol diacrylate (TPGDA), and ethyleneglycol diacrylate (EGDA).

11. The method of claim 7, wherein the first and second binders are the same or different from one another and independently further include a photocurable elastic polymer.

12. The method of claim 11, wherein the photocurable elastic polymer has an elongation of 15 to 200%, as measured according to ASTM D638.

13. The method of claim 11, wherein the photocurable elastic polymer includes at least one selected from the group consisting of polycaprolactone, a urethane acrylate-based polymer, and polyrotaxane.

14. The method of claim 13, wherein the polyrotaxane includes: a macrocycle in which lactone compounds with a (meth)acrylate moiety conjugated to the end thereof are bonded each other; a thread moiety held within the macrocycle; and stoppers provided at both ends of the thread moiety so as to prevent dissociation of the macrocycle.

15. The method of claim 1, wherein the supporting substrate includes at least one selected from the group consisting of polyethyleneterephthalate (PET), a cyclic olefin copolymer (COC), polyacrylate (PAC), polycarbonate (PC), polyethylene (PE), polymethylmethacrylate (PMMA), polyetheretherketone (PEEK), polyethylenenaphthalate (PEN), polyetherimide (PEI), polyimide (PI), and triacetylcellulose (TAC).

16. The method of claim 1, wherein the first and second inorganic particles have a particle size of 100 nm or less.

17. The method of claim 1, wherein each of the first and second inorganic particles includes at least one selected from the group consisting of silica nanoparticles, aluminum oxide nanoparticles, titanium oxide nanoparticles and zinc oxide nanoparticles.

18. The method of claim 1, wherein each of the first and second hard coating compositions further includes an additive.

19. The method of claim 18, wherein the additive includes at least one selected from the group consisting of a mono- to di-functional fluorine-based acrylate, a fluorine-based surfactant and a silicon-based surfactant.

20. The method of claim 18, wherein the additive includes a yellowing inhibitor containing a benzophenone compound or a benzotriazole compound.

* * * * *